United States Patent
Costeff et al.

(10) Patent No.: US 10,671,320 B2
(45) Date of Patent: Jun. 2, 2020

(54) CLUSTERED STORAGE SYSTEM CONFIGURED WITH DECOUPLING OF PROCESS RESTART FROM IN-FLIGHT COMMAND EXECUTION

(71) Applicant: EMC IP Holding Comany LLC, Hopkinton, MA (US)

(72) Inventors: Hillel Costeff, Tel Aviv (IL); Lior Kamran, Rishon LeZion (IL); Zvi Schneider, Tel Aviv (IL); Anton Kucherov, Dudley, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 16/043,281

(22) Filed: Jul. 24, 2018

(65) Prior Publication Data
US 2020/0034074 A1    Jan. 30, 2020

(51) Int. Cl.
*G06F 3/00* (2006.01)
*G06F 3/06* (2006.01)
(Continued)

(52) U.S. Cl.
CPC ............ *G06F 3/0659* (2013.01); *G06F 3/061* (2013.01); *G06F 3/067* (2013.01); *G06F 3/0632* (2013.01);
(Continued)

(58) Field of Classification Search
CPC ........ G06F 3/061; G06F 3/0632; G06F 3/067; G06F 9/526; G06F 9/544
(Continued)

(56) References Cited

U.S. PATENT DOCUMENTS

| 7,444,464 B2 | 10/2008 | Urmston et al. |
| 8,095,726 B1 | 1/2012 | O'Cconnell et al. |

(Continued)

FOREIGN PATENT DOCUMENTS

WO    2016111954 A1    7/2016

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Tim T Vo
*Assistant Examiner* — Kim T Huynh
(74) *Attorney, Agent, or Firm* — Ryan, Mason & Lewis, LLP

(57) ABSTRACT

A clustered storage system in one embodiment comprises a plurality of nodes, with each of at least a subset of the nodes comprising a set of processing modules configured to communicate over one or more networks with corresponding sets of processing modules on other ones of the nodes. In conjunction with a failure of a first instance of a process running on a given one of the nodes and a subsequent restart of a second instance of the process, at least one of the processing modules is to identify at least one transfer buffer command of the first instance of the process, to identify a plurality of logically ordered commands of the first instance of the process, and to provide distinct treatment of the transfer buffer command relative to treatment of the logically ordered commands in a manner that ensures that the restart of the second instance of the process is not delayed to await completion of the transfer buffer command or the logically ordered commands.

20 Claims, 5 Drawing Sheets

(51) Int. Cl.
*G06F 11/14* (2006.01)
*G06F 9/52* (2006.01)
*G06F 9/54* (2006.01)

(52) U.S. Cl.
CPC .............. *G06F 9/526* (2013.01); *G06F 9/544* (2013.01); *G06F 11/1438* (2013.01)

(58) Field of Classification Search
USPC ............... 711/114, 2, 12, 200–201; 710/3–7, 710/36–45, 20–21; 714/4.4, 20
See application file for complete search history.

(56) References Cited

U.S. PATENT DOCUMENTS

| | | | |
|---|---|---|---|
| 8,214,612 B1 | 7/2012 | Natanzon | |
| 9,104,326 B2 | 8/2015 | Frank et al. | |
| 9,208,162 B1 | 12/2015 | Hallak et al. | |
| 9,286,003 B1 | 3/2016 | Hallak et al. | |
| 9,606,870 B1 | 3/2017 | Meiri et al. | |
| 9,716,754 B2 | 7/2017 | Swift | |
| 2004/0010682 A1* | 1/2004 | Foster | H04L 63/0823 713/156 |
| 2005/0038772 A1* | 2/2005 | Colrain | G06F 9/5061 |
| 2007/0136552 A1* | 6/2007 | Yudenfriend | G06F 3/0617 711/201 |
| 2008/0244307 A1* | 10/2008 | Dasari | G06F 11/1482 714/4.12 |
| 2008/0279462 A1 | 11/2008 | Celi, Jr. | |
| 2009/0132955 A1 | 5/2009 | Garg et al. | |
| 2010/0179941 A1 | 7/2010 | Agrawal et al. | |
| 2013/0325824 A1 | 12/2013 | Shoens | |
| 2014/0181016 A1 | 6/2014 | Whitehead et al. | |
| 2016/0127467 A1* | 5/2016 | Mu | H04L 67/1097 709/213 |
| 2016/0150012 A1 | 5/2016 | Barszczak et al. | |
| 2016/0170987 A1 | 6/2016 | Kesselman | |
| 2016/0202927 A1 | 7/2016 | Klarakis et al. | |
| 2016/0224259 A1 | 8/2016 | Ahrens et al. | |
| 2019/0220297 A1* | 7/2019 | Rao | G06F 3/0664 |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

* cited by examiner

CLUSTERED STORAGE SYSTEM CONFIGURED WITH DECOUPLING OF PROCESS RESTART FROM IN-FLIGHT COMMAND EXECUTION

FIELD

The field relates generally to information processing systems, and more particularly to storage in information processing systems.

BACKGROUND

Clustered storage systems can include a potentially large number of distributed nodes interconnected by a mesh network or other type of communication network. A given such node of a clustered storage system typically runs processes that involve interaction of that node with one or more other nodes. If a process should fail, due to a software error or other type of failure, it will generally need to be restarted. However, there may be one or more commands of the failed process that were issued to other nodes prior to the failure but have not yet completed their execution on those other nodes. Such "in-flight" commands can cause problems in the clustered storage system by interfering with the restarted process. Many conventional systems are therefore configured to wait until all in-flight commands of the failed process are completed before restarting the process. Unfortunately, these and other conventional approaches can result in excessively long wait times before restart, which significantly undermines system performance. In some cases, the wait times can even extend beyond system-defined timeout limits, leading to the node being designated as a failed node, thereby further undermining system performance as well as system redundancy.

SUMMARY

Illustrative embodiments provide content addressable storage systems and other types of clustered storage systems that are configured for decoupling of process restart from in-flight command execution. Such embodiments can provide guarantees that in-flight commands of a failed process will not interfere with the operation of the corresponding restarted process. It is therefore not necessary in these embodiments to wait for in-flight commands of the failed process to complete before restarting the process. Decoupling of process restart from in-flight command execution advantageously avoids any significant degradation in performance or redundancy of the clustered storage system that might otherwise occur due to excessive wait times for in-flight command completion before process restart.

These embodiments illustratively include a clustered implementation of a content addressable storage system having a distributed storage controller. Similar advantages can be provided in other types of storage systems.

In one embodiment, a clustered storage system comprises a plurality of nodes, with each of at least a subset of the nodes comprising a set of processing modules configured to communicate over one or more networks with corresponding sets of processing modules on other ones of the nodes. In conjunction with a failure of a first instance of a process running on a given one of the nodes and a subsequent restart of a second instance of the process, at least one of the processing modules is to identify at least one transfer buffer command of the first instance of the process, to identify a plurality of logically ordered commands of the first instance of the process, and to provide distinct treatment of the transfer buffer command relative to treatment of the logically ordered commands in a manner that ensures that the restart of the second instance of the process is not delayed to await completion of the transfer buffer command or the logically ordered commands.

The sets of processing modules in some embodiments collectively comprise at least a portion of a distributed storage controller of the storage system. At least one of the sets of processing modules forming the distributed storage controller in such an embodiment illustratively comprises a system-wide management module implemented on a corresponding one of the nodes. At least some of the nodes illustratively comprise respective storage nodes each including one or more storage devices.

The transfer buffer command of the first instance of the process illustratively utilizes at least one node buffer which is also subject to utilization by the second instance of the process.

The logically ordered commands of the first instance of the process illustratively require strict ordering in their logical flow.

In some embodiments, providing distinct treatment of the transfer buffer command relative to treatment of the logically ordered commands comprises directing each of a plurality of other processes to identify any of its buffers that are in use by one or more transfer buffer commands of the first instance of the process, and marking the identified buffers as ghost buffers. Any buffer marked as a ghost buffer is not utilized by the other processes until such time as its marking as a ghost buffer is cleared. The second instance of the process is illustratively configured to perform the directing operation. In addition, the second instance of the process may periodically repeat the directing operation, and any buffer previously marked as a ghost buffer that is no longer in use by one or more transfer buffer commands of the first instance of the process has its marking as a ghost buffer cleared.

At least one of the processing modules may be further configured to associate unique connection identifiers with respective ones of the logically ordered commands of the first instance of the process. Each of a plurality of other processes maintains for each of a plurality of its connections a reference count which counts a number of logically ordered commands currently executing on that connection.

In some embodiments, providing distinct treatment of the transfer buffer command relative to treatment of the logically ordered commands comprises issuing at least one connection identifier update command to each of a plurality of other processes indicating that one or more connections having unique connection identifiers associated with respective ones of the logically ordered commands of the first instance of the process have been invalidated, and establishing new unique connection identifiers for association with respective ones of a plurality of logically ordered commands of the second instance of the process. Only a single unique connection identifier is considered valid at any given time for its corresponding connection.

Additionally or alternatively, providing distinct treatment of the transfer buffer command relative to treatment of the logically ordered commands in some embodiments comprises marking each of the logically ordered commands of the first instance of the process with a barrier flag. A particular one of the plurality of other processes receiving a given one of the logically ordered commands marked with the barrier flag waits for its maintained reference counts to go to zero on any invalidated connections before executing the given logically ordered command. The barrier flag in such an embodiment serves to establish a barrier between logically ordered commands of the first instance of the process and logically ordered commands of the second instance of the process.

The storage system in some embodiments comprises a content addressable storage system implemented utilizing non-volatile memory storage devices, such as flash-based storage devices. For example, the storage devices of the storage system in such embodiments can be configured to collectively provide an all-flash storage array. Numerous other storage system arrangements are possible in other embodiments.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
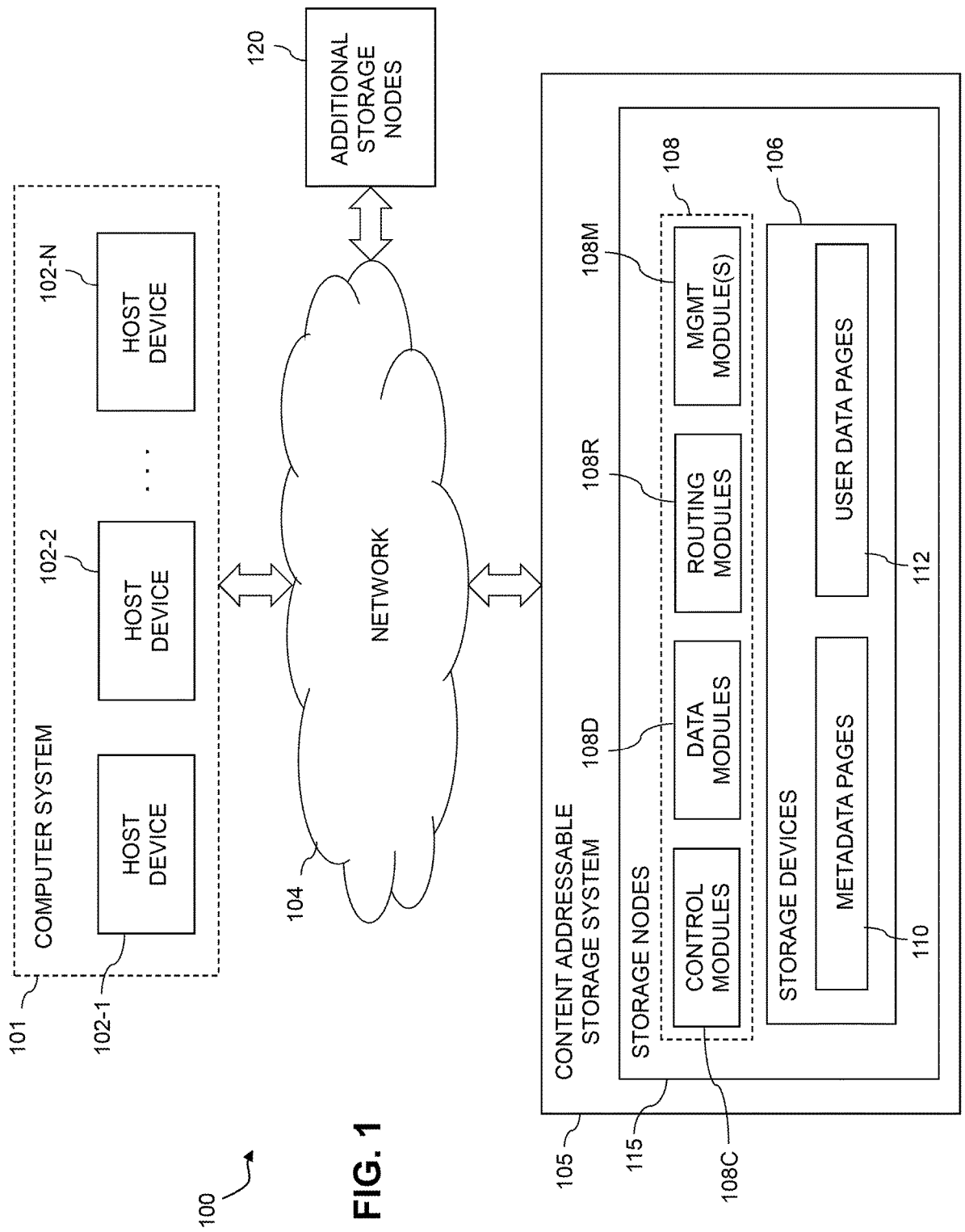
FIG. 1 is a block diagram of an information processing system comprising a content addressable storage system configured for decoupling of process restart from in-flight command execution in an illustrative embodiment.

FIG. 1 shows an information processing system 100 configured in accordance with an illustrative embodiment. The information processing system 100 comprises a computer system 101 that includes host devices 102-1, 102-2, . . . 102-N. The host devices 102 communicate over a network 104 with a content addressable storage system 105. The content addressable storage system 105 is an example of what is more generally referred to herein as a "storage system," and it is to be appreciated that a wide variety of other types of storage systems can be used in other embodiments.

The host devices 102 and content addressable storage system 105 illustratively comprise respective processing devices of one or more processing platforms. For example, the host devices 102 and the content addressable storage system 105 can each comprise one or more processing devices each having a processor and a memory, possibly implementing virtual machines and/or containers, although numerous other configurations are possible.

The host devices 102 and content addressable storage system 105 may be part of an enterprise computing and storage system, a cloud-based system or another type of system. For example, the host devices 102 and the content addressable storage system 105 can be part of cloud infrastructure such as an Amazon Web Services (AWS) system. Other examples of cloud-based systems that can be used to provide one or more of host devices 102 and content addressable storage system 105 include Google Cloud Platform (GCP) and Microsoft Azure.

The host devices 102 are configured to write data to and read data from the content addressable storage system 105. The host devices 102 and the content addressable storage system 105 may be implemented on a common processing platform, or on separate processing platforms. A wide variety of other types of host devices can be used in other embodiments.

The host devices 102 in some embodiments illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The content addressable storage system 105 is accessible to the host devices 102 over the network 104. The content addressable storage system 105 comprises a plurality of storage devices 106 and an associated storage controller 108. The storage devices 106 illustratively store metadata pages 110 and user data pages 112. The user data pages 112 in some embodiments are organized into sets of logical units (LUNs) each accessible to one or more of the host devices 102. The LUNs may be viewed as examples of what are also referred to herein as logical storage volumes of the content addressable storage system 105.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the content addressable storage system 105 illustratively comprises a scale-out all-flash content addressable storage array such as an XtremIO™ storage array from Dell EMC of Hopkinton, Mass. For example, the content addressable storage system 105 can comprise an otherwise conventional XtremIO™ storage array or other type of content addressable storage system that is suitably modified to incorporate decoupling of process restart from in-flight command execution as disclosed herein. Other types of storage arrays, including by way of example VNX® and Symmetrix VMAX® storage arrays also from Dell EMC, can be used to implement content addressable storage system 105 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing content addressable storage system 105 in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The content addressable storage system 105 in the FIG. 1 embodiment is implemented as at least a portion of a clustered storage system and includes a plurality of storage nodes 115 each comprising a corresponding subset of the storage devices 106. Other clustered storage system arrangements comprising multiple storage nodes can be used in other embodiments. A given clustered storage system may include not only storage nodes 115 but also additional storage nodes 120 coupled to network 104. Alternatively, such additional storage nodes 120 may be part of another clustered storage system of the system 100. Each of the storage nodes 115 of the content addressable storage system 105 is assumed to be implemented using at least one processing device comprising a processor coupled to a memory.

Other arrangements of storage nodes or other types of nodes can be used. The term "node" as used herein is intended to be broadly construed and a given such node need not include storage devices.

The storage controller 108 in this embodiment is implemented in a distributed manner so as to comprise a plurality of distributed storage controller components implemented on respective ones of the storage nodes 115. The storage controller 108 is therefore an example of what is more generally referred to herein as a "distributed storage controller." Accordingly, in subsequent description herein, the storage controller 108 is more particularly referred to as a distributed storage controller. Other types of potentially non-distributed storage controllers can be used in other embodiments.

Each of the storage nodes 115 in this embodiment further comprises a set of processing modules configured to communicate over one or more networks with corresponding sets of processing modules on other ones of the storage nodes 115. The sets of processing modules of the storage nodes 115 collectively comprise at least a portion of the distributed storage controller 108 of the content addressable storage system 105.

The modules of the distributed storage controller 108 in the present embodiment more particularly comprise different sets of processing modules implemented on each of the storage nodes 115. The set of processing modules of each of the storage nodes 115 comprises at least a control module 108C, a data module 108D and a routing module 108R. The distributed storage controller 108 further comprises one or more management ("MGMT") modules 108M. For example, only a single one of the storage nodes 115 may include a management module 108M. It is also possible that management modules 108M may be implemented on each of at least a subset of the storage nodes 115.

Each of the storage nodes 115 of the content addressable storage system 105 therefore comprises a set of processing modules configured to communicate over one or more networks with corresponding sets of processing modules on other ones of the storage nodes. A given such set of processing modules implemented on a particular storage node illustratively includes at least one control module 108C, at least one data module 108D and at least one routing module 108R, and possibly a management module 108M. These sets of processing modules of the storage nodes collectively comprise at least a portion of the distributed storage controller 108.

Communication links may be established between the various processing modules of the distributed storage controller 108 using well-known communication protocols such as IP, Transmission Control Protocol (TCP), and remote direct memory access (RDMA). For example, respective sets of IP links used in data transfer and corresponding messaging could be associated with respective different ones of the routing modules 108R.

The distributed storage controller 108 of the content addressable storage system 105 in the present embodiment is configured to control the implementation of functionality for decoupling of process restart from in-flight command execution as disclosed herein. The distributed storage controller 108 is assumed to comprise a type of "processing device" as that term is broadly used herein, and more particularly comprises at least one processor coupled to a memory.

For example, in some embodiments, in conjunction with a failure of a first instance of a process running on a given one of the storage nodes 115 and a subsequent restart of a second instance of the process, at least one of the processing modules of the distributed storage controller 108 is configured to identify at least one transfer buffer command of the first instance of the process, to identify a plurality of logically ordered commands of the first instance of the process, and to provide distinct treatment of the transfer buffer command relative to treatment of the logically ordered commands in a manner that ensures that the restart of the second instance of the process is not delayed to await completion of the transfer buffer command or the logically ordered commands.

The distinct treatment of the transfer buffer command relative to treatment of the logically ordered commands is more specifically implemented under the control of the management module 108M of the distributed storage controller 108. The management module 108M is an example of what is more generally referred to herein as a system-wide manager, and is assumed to be implemented on a corresponding one of the storage nodes 115. The term "system-wide manager" in this context refers to an entity that provides management functionality for operations occurring throughout the content addressable storage system 105.

The subsequent restart of the second instance of the process can be on the same one of the storage nodes 115 on which the failed first instance of the process was running. Alternatively, the subsequent restart of the second instance of the process in some cases may be on a different one of the storage nodes 115.

It is assumed in some embodiments that the processing modules of the distributed controller 108 are interconnected in a full mesh network, such that a process of one of the processing modules can communicate with processes of any of the other processing modules. Commands issued by the processes can include, for example, remote procedure calls (RPCs) directed to other ones of the processes. It is further assumed that when a given process P fails, it is restarted as a process P_new.

As will be described, illustrative embodiments allow such a process restart to occur in the content addressable storage system 105 without waiting for completion of any in-flight commands issued by process P prior to its failure. The various processes are illustratively managed at least in part by the management module 108M. For example, the management module 108M or another type of system-wide manager can detect the failure of process P and restart that process as P_new. These illustrative embodiments ensure that no in-flight commands of process P will interfere with commands of restarted process P_new.

Accordingly, restarted process P_new can begin immediately after P fails, without any dependence whatsoever on the duration of particular in-flight commands. This illustratively involves distinguishing between at least transfer buffer commands and logically ordered commands of the failed process P and providing different treatments for each. Other commands in some embodiments are considered "simple" commands or other types of standard commands that do not require any type of special treatment such as that provided for the transfer buffer commands and the logically ordered commands. These standard commands in some cases are completely self-contained commands in that they do not point to buffers and do not require logical ordering. Examples of standard commands of this type include commands for hardware state queries.

The transfer buffer command of the first instance of the process is assumed to utilize at least one node buffer of the distributed storage controller 108 which is also subject to utilization by the second instance of the process. Such a node buffer is illustratively implemented in a memory of one of the storage nodes 115. Transfer buffer commands point to buffers but do not require logical ordering in their execution.

For example, transfer buffer commands in some embodiments comprise commands used to read data into a buffer. A given process P may send a command to another process S to read data into the buffer. The process S is also referred to as a "target process" of the process P. If process P fails and is restarted as process P_new, the restarted process P_new is unaware of the in-flight command sent by failed process P, and absent use of the decoupling techniques disclosed herein, may reuse the buffer for another command, resulting in data corruption.

The logically ordered commands of the first instance of the process are assumed to require strict ordering in their logical flow.

For example, logically ordered commands in some embodiments comprise a sequence of commands of a metadata flow that updates data structures in a predefined location (e.g., a predefined offset associated with a header portion of a persistent storage device). A given process P may send a command to a target process S with data to update the predefined location. If process P fails and is restarted as process P_new, the restarted process P_new is unaware of the in-flight command sent by failed process P, and absent use of the decoupling techniques disclosed herein, may send another command with different data to the same predefined location, resulting in data corruption.

As noted above, the remaining commands in the present embodiment are considered simple commands or other types of standard commands that do not point to buffers and do not require logical ordering in their execution. Such commands are completely agnostic to restarts, such that a given standard command from process P and the same command from restarted process P_new can both be executed concurrently by target process S without introducing any potential data corruption. As a result, no special handling or other type of special treatment is needed for these commands.

In some embodiments, providing distinct treatment of the transfer buffer command relative to treatment of the logically ordered commands comprises directing each of a plurality of other processes to identify any of its buffers that are in use by one or more transfer buffer commands of the first instance of the process, and marking the identified buffers as "ghost" buffers. Any buffer marked as a ghost buffer is not utilized by the other processes until such time as its marking as a ghost buffer is cleared. The second instance of the process illustratively performs the directing operation in such an embodiment. For example, the second instance of the process can periodically repeat the directing operation, and any buffer previously marked as a ghost buffer that is no longer in use by one or more transfer buffer commands of the first instance of the process has its marking as a ghost buffer cleared.

A more particular example of the distinct treatment of transfer buffer commands in an illustrative embodiment includes the following operations:

1. When P_new starts, it queries all other processes about any buffers that it owns and that are still in use from previous commands that P initiated. These buffers will be marked as ghost buffers locally.

2. The ghost buffers are not utilized until their marking as such is cleared.

3. Normal input-output (IO) operations are resumed using P_new, although with a slightly reduced number of buffers.

4. Periodically, P_new will again query all other processes about any buffers that it owns and that are still in use from previous commands that P initiated. As some of the in-flight commands may have completed since the previous query, the corresponding ghost buffers can have their markings cleared, such that the buffers are safely reclaimed.

These particular operations are only an example, and additional or alternative operations can be used in other embodiments.

A different type of treatment is provided for the logically ordered commands, illustratively based on unique connection identifiers. For example, one or more of the processing modules of the distributed storage controller 108 is configured to associate unique connection identifiers with respective ones of the logically ordered commands of the first instance of the process. Also, each of a plurality of other processes maintains for each of a plurality of its connections a reference count which counts a number of logically ordered commands currently executing on that connection.

In such an embodiment, providing distinct treatment of the transfer buffer command relative to treatment of the logically ordered commands comprises issuing at least one connection identifier update command to each of a plurality of other processes indicating that one or more connections having unique connection identifiers associated with respective ones of the logically ordered commands of the first instance of the process have been invalidated, and establishing new unique connection identifiers for association with respective ones of a plurality of logically ordered commands of the second instance of the process. Only a single unique connection identifier is considered valid at any given time for its corresponding connection.

Additionally or alternatively, providing distinct treatment of the transfer buffer command relative to treatment of the logically ordered commands comprises marking each of the logically ordered commands of the first instance of the process with a barrier flag. A particular one of the plurality of other processes receiving a given one of the logically ordered commands marked with the barrier flag waits for its maintained reference counts to go to zero on any invalidated connections before executing the given logically ordered command. The barrier flag serves to establish a barrier between logically ordered commands of the first instance of the process and logically ordered commands of the second instance of the process.

A more particular example of the distinct treatment of logically ordered commands in an illustrative embodiment includes the following operations:

1. A system-wide manager such as management module 108M generates a unique connection ID to be sent along with each such command.

2. Each process keeps a reference count which counts the number of logically ordered commands currently executing on each of its connections.

3. Upon failure of process P, the system-wide manager issues an ID update command to all running processes. This is a relatively short command that marks the current connection ID to the failed process P as invalid ("invalidated") and sets a new unique ID for the restarted process P_new. When this ID update command completes, new connections can be opened with the new unique ID such that there is only a single unique ID considered valid at any given time per connection and the restarted process P_new can start operating. No new commands are sent to the invalidated connection.

4. In-flight commands that run to completion on an invalidated connection are ignored. No other process is expecting such commands, as they came from the failed process P.

5. Logically ordered commands are marked as such with a barrier flag. When receiving a command with this flag, the target process S will wait for all reference counts to go to 0 on all invalidated connections, and only then execute the command, such that the flag acts as a barrier between commands of the failed process P and the restarted process P_new.

Again, these particular operations are only an example, and additional or alternative operations can be used in other embodiments.

Although discussed separately in the description above, the various distinct treatments for different command types are generally applied concurrently to their corresponding respective command types. Also, at least portions of one or more of the treatments in some embodiments can be initiated or otherwise applied at least in part prior to the detection of the process failure. A number of different techniques can be used for "identifying" commands of particular types as that term is broadly used herein. For example, command codes, fields or other distinguishing information of the commands can be used in identifying commands of particular types. Other command types, identifying mechanisms and associated distinct treatments can be used in other embodiments.

Various aspects of page storage in the content addressable storage system 105 will now be described in greater detail. As indicated above, the storage devices 106 are configured to store metadata pages 110 and user data pages 112, and in some embodiments may also store additional information not explicitly shown such as checkpoints and write journals. The metadata pages 110 and the user data pages 112 are illustratively stored in respective designated metadata and user data areas of the storage devices 106. Accordingly, metadata pages 110 and user data pages 112 may be viewed as corresponding to respective designated metadata and user data areas of the storage devices 106.

The term "page" as used herein is intended to be broadly construed so as to encompass any of a wide variety of different types of blocks that may be utilized in a block storage device of a storage system. Such storage systems are not limited to content addressable storage systems of the type disclosed in some embodiments herein, but are more generally applicable to any storage system that includes one or more block storage devices. Different native page sizes are generally utilized in different storage systems of different types. For example, XtremIO™ X1 storage arrays utilize a native page size of 8 KB, while XtremIO™ X2 storage arrays utilize a native page size of 16 KB. Larger native page sizes of 64 KB and 128 KB are utilized in VMAX® V2 and VMAX® V3 storage arrays, respectively. The native page size generally refers to a typical page size at which the storage system ordinarily operates, although it is possible that some storage systems may support multiple distinct page sizes as a configurable parameter of the system. Each such page size of a given storage system may be considered a "native page size" of the storage system as that term is broadly used herein.

A given "page" as the term is broadly used herein should therefore not be viewed as being limited to any particular range of fixed sizes. In some embodiments, a page size of 8 KB is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 110 and the user data pages 112.

The user data pages 112 are part of a plurality of LUNs configured to store files, blocks, objects or other arrangements of data, each also generally referred to herein as a "data item," on behalf of users associated with host devices 102. Each such LUN may comprise particular ones of the above-noted pages of the user data area. The user data stored in the user data pages 112 can include any type of user data that may be utilized in the system 100. The term "user data" herein is therefore also intended to be broadly construed.

The content addressable storage system 105 is configured to generate hash metadata providing a mapping between content-based digests of respective ones of the user data pages 112 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 112. The hash metadata generated by the content addressable storage system 105 is illustratively stored as metadata pages 110 in the metadata area. The generation and storage of the hash metadata is assumed to be performed under the control of the distributed storage controller 108.

Each of the metadata pages 110 characterizes a plurality of the user data pages 112. For example, a given set of user data pages representing a portion of the user data pages 112 illustratively comprises a plurality of user data pages denoted User Data Page 1, User Data Page 2, . . . User Data Page n.

Each of the user data pages 112 in this example is characterized by a LUN identifier, an offset and a content-based signature. The content-based signature is generated as a hash function of content of the corresponding user data page. Illustrative hash functions that may be used to generate the content-based signature include the SHA1 hash function, where SHA denotes Secure Hashing Algorithm, or other secure hashing algorithms known to those skilled in the art, including SHA2, SHA256 and many others. The content-based signature is utilized to determine the location of the corresponding user data page within the user data area of the storage devices 106.

Each of the metadata pages 110 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 110 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 105 is illustratively distributed among the control modules 108C.

The functionality for decoupling of process restart from in-flight command execution in this embodiment is assumed to be distributed across multiple distributed processing modules, including at least a subset of the processing modules 108C, 108D, 108R and 108M of the distributed storage controller 108.

For example, the management module 108M of the distributed storage controller 108 may include process failure detection and restart control logic that engages or otherwise interacts with corresponding control logic instances in at least a subset of the control modules 108C, data modules 108D and routing modules 108R in order to implement decoupling of process restart from in-flight command execution.

In some embodiments, the content addressable storage system 105 comprises an XtremIO™ storage array suitably modified to incorporate techniques for decoupling of process restart from in-flight command execution as disclosed herein.

In arrangements of this type, the control modules 108C, data modules 108D and routing modules 108R of the distributed storage controller 108 illustratively comprise respective C-modules, D-modules and R-modules of the XtremIO™ storage array. The one or more management modules 108M of the distributed storage controller 108 in such arrangements illustratively comprise a system-wide management module ("SYM module") of the XtremIO™ storage array, although other types and arrangements of system-wide management modules can be used in other embodiments. Accordingly, functionality for decoupling of process restart from in-flight command execution in some embodiments is implemented under the control of at least one system-wide management module of the distributed storage controller 108, utilizing the C-modules, D-modules and R-modules of the XtremIO™ storage array.

In the above-described XtremIO™ storage array example, each user data page has a fixed size such as 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller 108 in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 108C such that control of the slices within the distributed storage controller 108 is substantially evenly distributed over the control modules 108C of the distributed storage controller 108.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 105 each illustratively comprise one or more IO operations directing that at least one data item of the content addressable storage system 105 be written to in a particular manner. A given write request is illustratively received in the content addressable storage system 105 from a host device, illustratively one of the host devices 102. In some embodiments, a write request is received in the distributed storage controller 108 of the content addressable storage system 105, and directed from one processing module to another processing module of the distributed storage controller 108. For example, a received write request may be directed from a routing module 108R of the distributed storage controller 108 to a particular control module 108C of the distributed storage controller 108. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 115 communicate with one another over a high-speed internal network such as an InfiniBand network. The C-modules, D-modules and R-modules coordinate with one another to accomplish various IO processing tasks.

The write requests from the host devices 102 identify particular data pages to be written in the content addressable storage system 105 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The content addressable storage system 105 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the content addressable storage system 105. The HMD table in some embodiments disclosed herein is more particularly referred to as a hash-to-data ("H2D") table.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 106. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the content addressable storage system 105 correspond to respective physical blocks of a physical layer of the content addressable storage system 105. The user data pages of the logical layer are organized by LBA and have reference via respective content-based signatures to particular physical blocks of the physical layer.

Each of the physical blocks has an associated reference count that is maintained within the content addressable storage system 105. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 108C, 108D, 108R and 108M as shown in the FIG. 1 embodiment is presented by way of example only. Numerous alternative arrangements of processing modules of a distributed storage controller may be used to implement functionality for decoupling of process restart from in-flight command execution in a clustered storage system in other embodiments.

Additional examples of content addressable storage functionality implemented in some embodiments by control modules 108C, data modules 108D, routing modules 108R and management module(s) 108M of distributed storage controller 108 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

As indicated previously, the host devices 102 and content addressable storage system 105 in the FIG. 1 embodiment are assumed to be implemented using at least one processing platform each comprising one or more processing devices each having a processor coupled to a memory. Such processing devices can illustratively include particular arrangements of compute, storage and network resources.

The host devices 102 and the content addressable storage system 105 may be implemented on respective distinct processing platforms, although numerous other arrangements are possible. For example, in some embodiments at least portions of the host devices 102 and the content addressable storage system 105 are implemented on the same processing platform. The content addressable storage system 105 can therefore be implemented at least in part within at least one processing platform that implements at least a one of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and the content addressable storage system 105 to reside in different data centers. Numerous other distributed implementations of the host devices 102 and/or the content addressable storage system 105 are possible. Accordingly, the content addressable storage system 105 can also be implemented in a distributed manner across multiple data centers.

Additional examples of processing platforms utilized to implement host devices and/or storage systems in illustrative embodiments will be described in more detail below in conjunction with FIGS. 4 and 5.

It is to be appreciated that these and other features of illustrative embodiments are presented by way of example only, and should not be construed as limiting in any way.

Accordingly, different numbers, types and arrangements of system components such as host devices 102, network 104, content addressable storage system 105, storage devices 106, storage controllers 108 and storage nodes 115 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in some embodiments, at least portions of the functionality for decoupling of process restart from in-flight command execution as disclosed herein can be implemented in a host device, in a storage system, or partially in a host device and partially in a storage system.

Illustrative embodiments are therefore not limited to arrangements in which all such functionality is implemented in a host device or a storage system, and therefore encompass various hybrid arrangements in which the functionality is distributed over one or more host devices and one or more storage systems, each comprising one or more processing devices.

Figure 2:
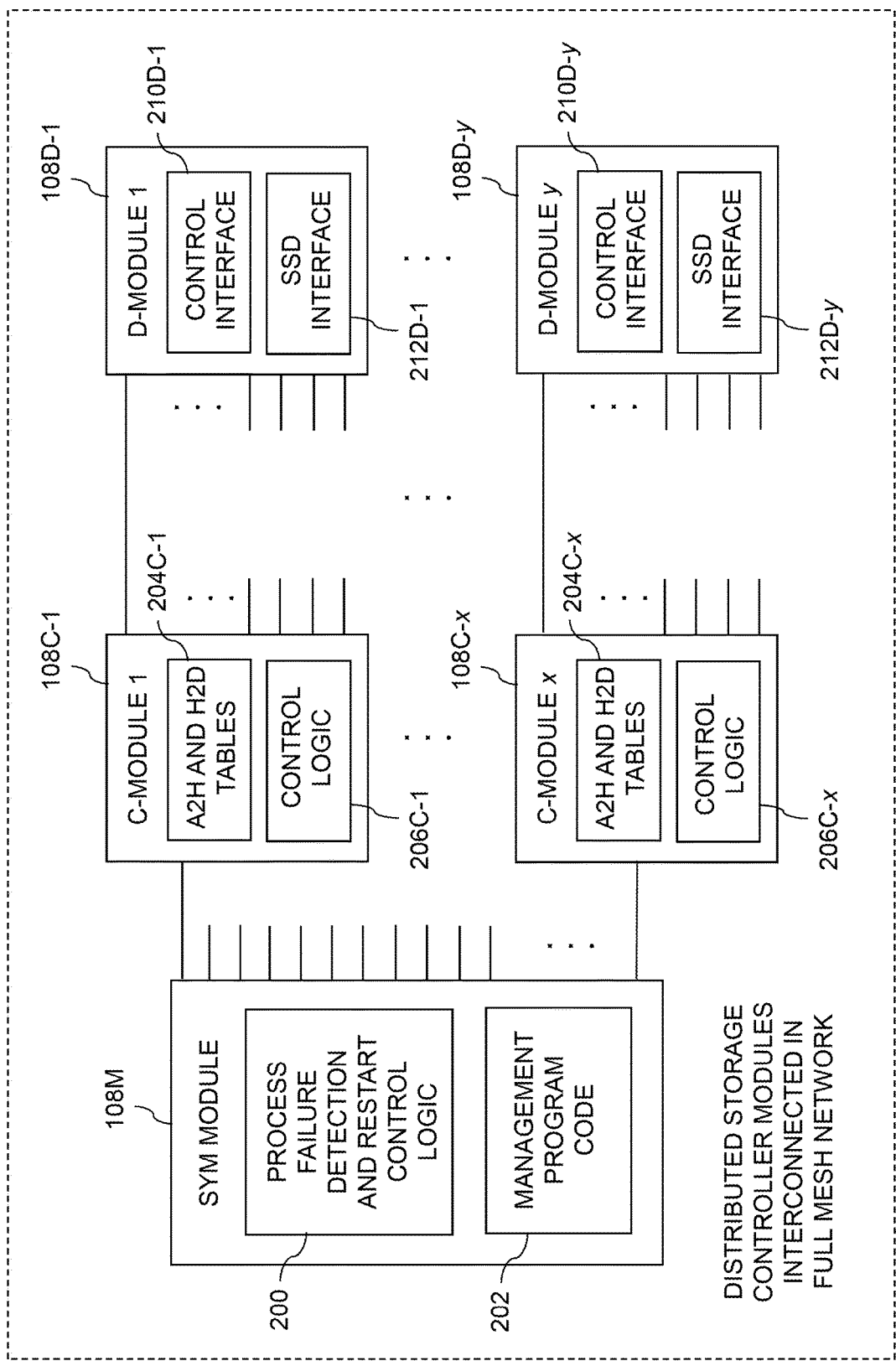
FIG. 2 illustrates a portion of a distributed storage controller of a content addressable storage system showing one possible arrangement utilizing control modules and data modules interconnected by a mesh network and configured for decoupling of process restart from in-flight command execution in an illustrative embodiment.

Referring now to FIG. 2, a more detailed view of a portion of the distributed storage controller 108 in an illustrative embodiment is shown. This embodiment illustrates an example arrangement of control modules 108C, data modules 108D and a management module 108M of the distributed storage controller 108. It is assumed in this embodiment that these and possibly other modules of the distributed storage controller 108 are interconnected in a full mesh network, such that each of the modules can communicate with each of the other modules, although other types of networks and different module interconnection arrangements can be used in other embodiments.

The management module 108M of the distributed storage controller 108 in this embodiment more particularly comprises a system-wide management module or SYM module of the type mentioned previously. Although only a single SYM module is shown in this embodiment, other embodiments can include multiple instances of the SYM module possibly implemented on different ones of the storage nodes. It is therefore assumed that the distributed storage controller 108 comprises one or more management modules 108M.

A given instance of management module 108M comprises process failure detection and restart control logic 200 and associated management program code 202. The management module 108M communicates with control modules 108C-1 through 108C-x, also denoted as C-module 1 through C-module x. The control modules 108C communicate with data modules 108D-1 through 108D-y, also denoted as D-module 1 through D-module y. The variables x and y are arbitrary integers greater than one, and may but need not be equal. In some embodiments, each of the storage nodes 115 of the content addressable storage system 105 comprises one of the control modules 108C and one of the data modules 108D, as well as one or more additional modules including one of the routing modules 108R. A wide variety of alternative configurations of nodes and processing modules are possible in other embodiments. Also, the term "storage node" as used herein is intended to be broadly construed, and may comprise a node that implements storage control functionality but does not necessarily incorporate storage devices.

The control modules 108C-1 through 108C-x in the FIG. 2 embodiment comprise respective sets of A2H and H2D tables 204C-1 through 204C-x. The A2H tables are utilized to store address-to-hash mapping information and the H2D tables are utilized to store hash-to-data mapping information, in support of mapping of logical addresses for respective pages to corresponding physical addresses for those pages via respective hashes or other types of content-based signatures, as described in further detail elsewhere herein. The control modules 108C-1 through 108C-x further comprise corresponding instances of process failure detection and restart control logic 206C-1 through 206C-x that interact with the control logic of the management module 108M to support decoupling of process restart and in-flight command execution as disclosed herein.

The control modules 108C may further comprise additional components not explicitly shown in FIG. 2, such as respective messaging interfaces that are utilized by the control modules 108 to generate control-to-routing messages for transmission to the routing modules 108R, and to process routing-to-control messages received from the routing modules 108R. Such messaging interfaces can also be configured to generate messages for transmission to the management module 108M and to process instructions and other messages received from the management module 108M.

The data modules 108D-1 through 108D-y in the FIG. 2 embodiment comprise respective control interfaces 210D-1 through 210D-y. These control interfaces 210D support communication between the data modules 108D and corresponding ones of the control modules 108C. Also included in the data modules 108D-1 through 108D-y are respective SSD interfaces 212D-1 through 212D-y. These SSD interfaces 212D support communications with corresponding ones of the storage devices 106.

Figure 3:
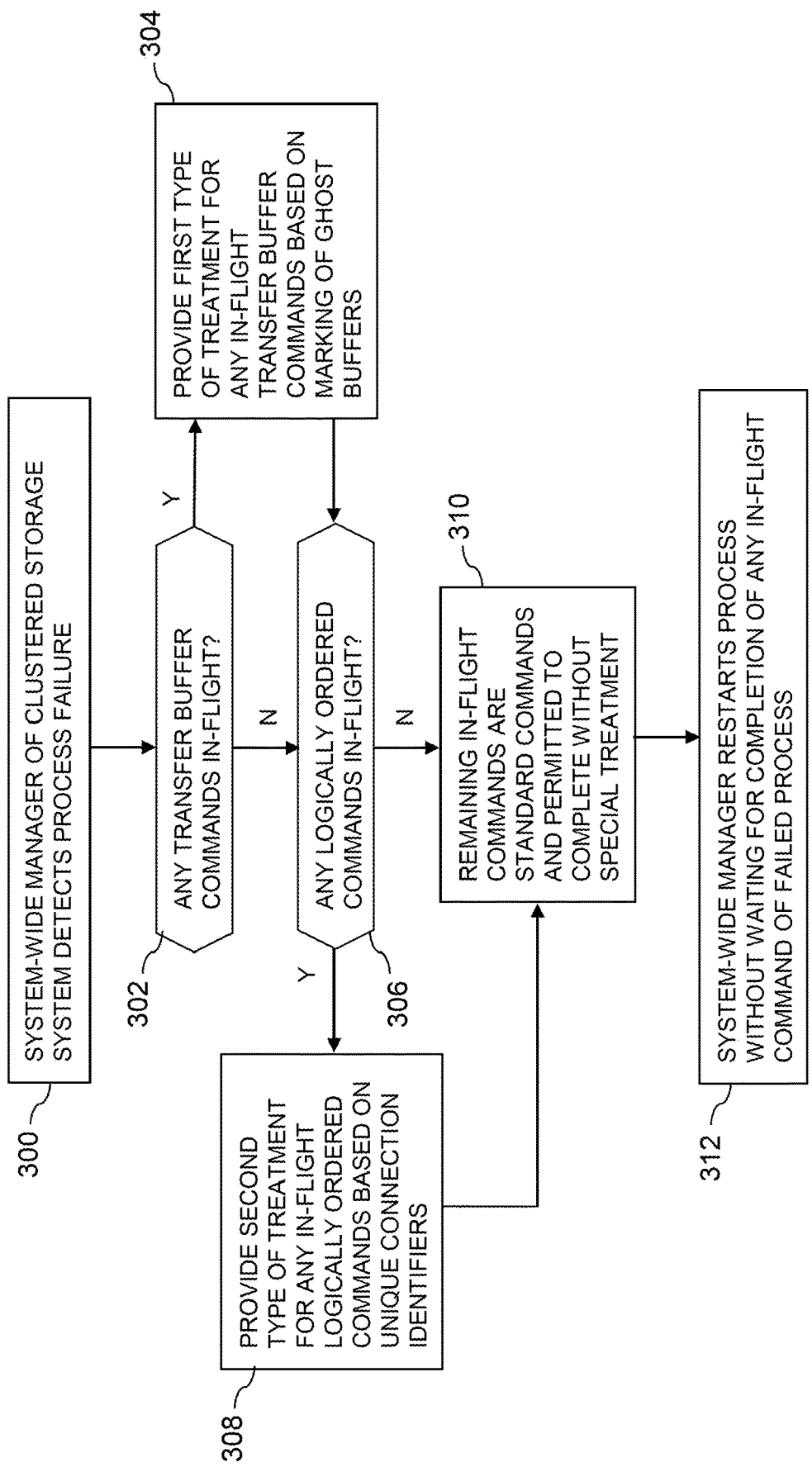
FIG. 3 is a flow diagram showing decoupling of process restart from in-flight command execution system in an illustrative embodiment.

The operation of the information processing system 100 will now be described in further detail with reference to the flow diagram of FIG. 3. The flow diagram of FIG. 3 illustrates a set of processing operations implementing functionality for decoupling of process restart from in-flight command execution in a content addressable storage system. The process includes steps 300 through 312, and is suitable for use in system 100 but is more generally applicable to other types of systems in which it is desirable to provide rapid restarting of a failed process without waiting for completion of any in-flight commands issued by the process before it failed. The steps of the flow diagram are illustratively performed at least in part under the control of a storage controller of a storage system, such as the distributed storage controller 108 of content addressable storage system 105.

In step 300, a system-wide manager of a clustered storage system detects a process failure. The system-wide manager illustratively comprises SYM module 108M of storage controller 108 in the content addressable storage system 105, although other types of system-wide managers can be used, and such managers can be implemented on a single node of the clustered storage system or distributed across multiple nodes of the clustered storage system.

In step 302, a determination is made as to whether or not any transfer buffer commands are in-flight at the time of the failure. If there is at least one transfer buffer command that is in-flight at the time of the failure, the FIG. 3 process moves to step 304, and otherwise moves to step 306 as shown.

In step 304, a first type of treatment is provided for any in-flight transfer buffer commands based on marking of ghost buffers. The FIG. 3 process then moves to step 306. Accordingly, step 304 is performed only if there is at least one in-flight transfer buffer command, and otherwise step 304 is bypassed.

In step 306, a determination is made as to whether or not any logically ordered commands are in-flight at the time of the failure. If there are logically ordered commands that are in-flight at the time of the failure, the FIG. 3 process moves to step 308, and otherwise moves to step 310 as shown.

In step 308, a second type of treatment is provided for any in-flight logically ordered commands based on unique connection identifiers. The FIG. 3 process then moves to step 310. Accordingly, step 308 is performed only if there are in-flight logically ordered commands, and otherwise step 308 is bypassed.

The second type of treatment provided for in-flight logically ordered commands in step 308 is based on unique connection identifiers and is therefore different than the first type of treatment provided for in-flight transfer buffer commands based on marking of ghost buffers in step 304.

In step 310, any remaining in-flight commands are assumed to be standard commands and permitted to complete without special treatment. Such remaining in-flight commands in this embodiment include all commands that are not transfer buffer commands or logically ordered commands.

Although the various distinct treatments referred to steps 304, 308 and 310 are illustratively shown in the figure as being performed separately and sequentially, this is for clarity and simplicity of illustration only, and these treatments are generally applied concurrently to their corresponding respective command types. Also, at least portions of one or more of the treatments in some embodiments can be initiated or otherwise applied at least in part prior to the detection of the process failure in step 300. The determinations in steps 302 and 306 are considered examples of arrangements involving "identifying" of commands of particular types as that term is broadly used herein. Other types of commands, identifying mechanisms and associated distinct treatments can be used in other embodiments.

In step 312, the system-wide manager restarts the failed process without waiting for completion of any in-flight command of the failed process. The distinct treatments provided for the transfer buffer commands in step 304 and for the logically ordered commands in step 308 ensure that the failed process can be restarted without the in-flight commands generated prior to the failure interfering in any way with the restarted process.

The particular processing operations and other system functionality described above in conjunction with the flow diagram of FIG. 3 are presented by way of illustrative example only, and should not be construed as limiting the scope of the disclosure in any way. Alternative embodiments can use other types of processing operations for decoupling of process restart from in-flight command execution in a content addressable storage system. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to handle multiple detected failures and corresponding restarts within a given storage system.

Functionality such as that described in conjunction with the flow diagram of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

A storage controller such as distributed storage controller 108 that is configured to control performance of one or more steps of the process of the flow diagram of FIG. 3 in system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The host devices 102 and content addressable storage system 105 of system 100, as well as other system components, may be implemented at least in part using processing devices of such processing platforms. For example, in the distributed storage controller 108, respective distributed modules can be implemented in respective containers running on respective ones of the processing devices of a processing platform.

Illustrative embodiments of storage systems with functionality for decoupling of process restart from in-flight command execution as disclosed herein can provide a number of significant advantages relative to conventional arrangements.

For example, some embodiments provide content addressable storage systems and other types of clustered storage systems that are configured in a manner that guarantees that in-flight commands of a failed process will not interfere with the operation of the corresponding restarted process. The decoupling of process restart and in-flight command execution in some embodiments therefore maintains consistency of command execution between the failed and restarted processes. It is therefore not necessary in such embodiments to wait for in-flight commands of the failed process to complete before restarting the process.

Decoupling of process restart from in-flight command execution advantageously avoids any significant degradation in performance or redundancy of the clustered storage system that might otherwise occur due to excessive wait times for in-flight command completion before process restart.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for decoupling of process restart from in-flight command execution will now be described in greater detail with reference to FIGS. 4 and 5. Although described in the context of system 100, these platforms may also be used to implement at least portions of other information processing systems in other embodiments.

Figure 4:
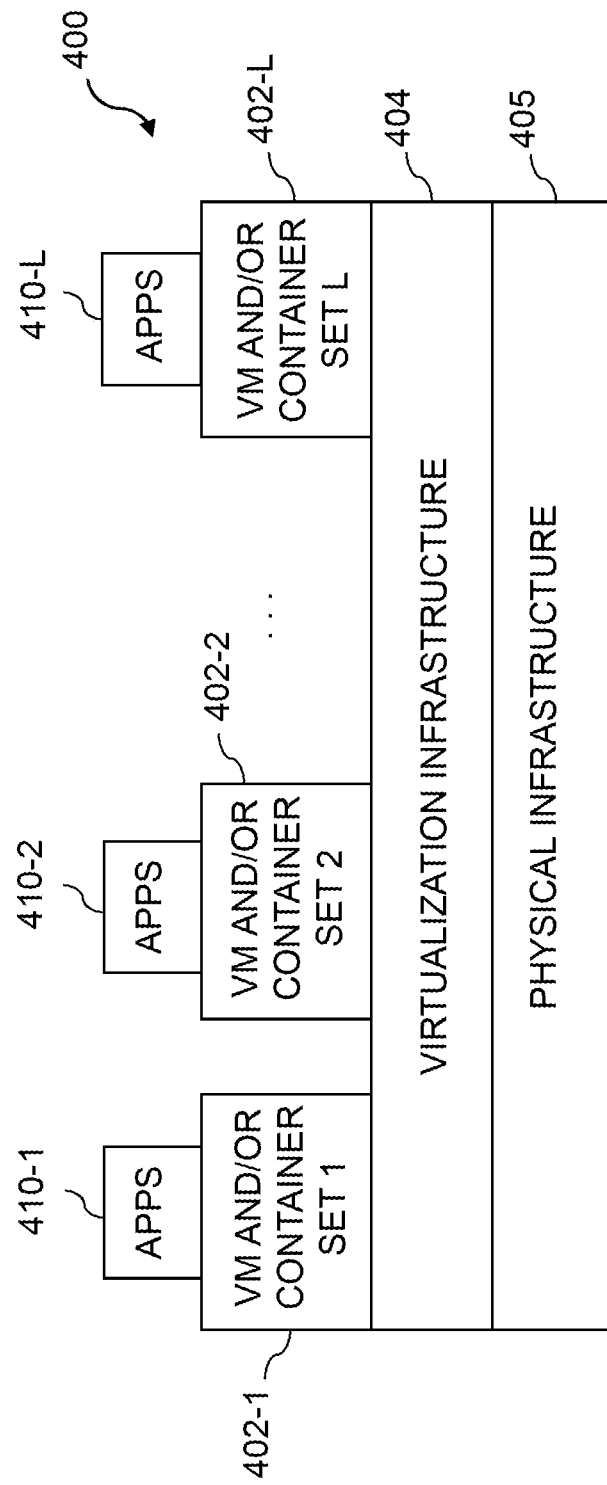
FIGS. 4 and 5 show examples of processing platforms that may be utilized to implement at least a portion of an information processing system in illustrative embodiments.
Figure 5:
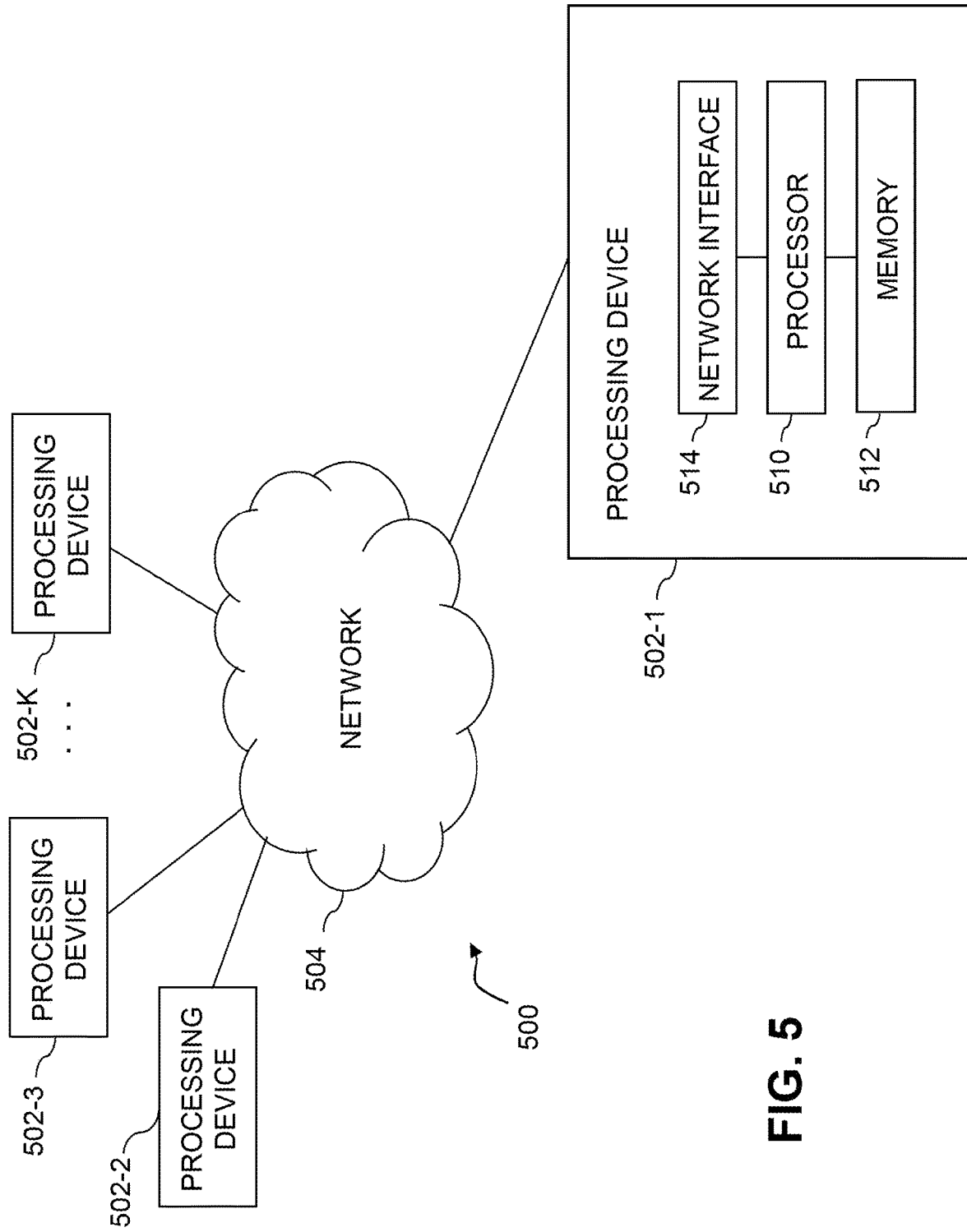

FIG. 4 shows an example processing platform comprising cloud infrastructure 400. The cloud infrastructure 400 comprises a combination of physical and virtual processing resources that may be utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. Such implementations can provide storage functionality of the type described above for one or more processes running on a given one of the VMs.

An example of a hypervisor platform that may be used to implement a hypervisor within the virtualization infrastructure 404 is the VMware® vSphere® which may have an associated virtual infrastructure management system such as the VMware® vCenter™. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system. Such implementations can provide storage functionality of the type described above for one or more processes running on different ones of the containers. For example, a container host device supporting multiple containers of one or more container sets can implement one or more instances of the FIG. 3 process for decoupling of process restart from in-flight command execution.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the storage functionality of one or more components of a host device or storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, failure detection and restart processes and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    a clustered storage system comprising a plurality of nodes;
    each of at least a subset of the nodes further comprising:
    a processor coupled to a memory; and
    a set of processing modules configured to communicate over one or more networks with corresponding sets of processing modules on other ones of the nodes;
    in conjunction with a failure of a first instance of a process running on a given one of the nodes and a subsequent restart of a second instance of the process, at least one of the processing modules being configured:
    to identify at least one transfer buffer command of the first instance of the process;
    to identify a plurality of logically ordered commands of the first instance of the process; and
    to provide distinct treatment of the transfer buffer command relative to treatment of the logically ordered commands in a manner that ensures that the restart of the second instance of the process is not delayed to await completion of the transfer buffer command or the logically ordered commands.

2. The apparatus of claim 1 wherein the sets of processing modules collectively comprise at least a portion of a distributed storage controller of the storage system.

3. The apparatus of claim 1 wherein the transfer buffer command of the first instance of the process utilizes at least one node buffer which is also subject to utilization by the second instance of the process.

4. The apparatus of claim 1 wherein the logically ordered commands of the first instance of the process require strict ordering in their logical flow.

5. The apparatus of claim 1 wherein providing distinct treatment of the transfer buffer command relative to treatment of the logically ordered commands comprises:
    directing each of a plurality of other processes to identify any of its buffers that are in use by one or more transfer buffer commands of the first instance of the process; and
    marking the identified buffers as ghost buffers;

wherein any buffer marked as a ghost buffer is not utilized by the other processes until such time as its marking as a ghost buffer is cleared.

6. The apparatus of claim 5 wherein the second instance of the process performs the directing.

7. The apparatus of claim 6 wherein the second instance of the process periodically repeats the directing and further wherein any buffer previously marked as a ghost buffer that is no longer in use by one or more transfer buffer commands of the first instance of the process has its marking as a ghost buffer cleared.

8. The apparatus of claim 1 wherein said at least one of the processing modules is further configured to associate unique connection identifiers with respective ones of the logically ordered commands of the first instance of the process.

9. The apparatus of claim 8 wherein each of a plurality of other processes maintains for each of a plurality of its connections a reference count which counts a number of logically ordered commands currently executing on that connection.

10. The apparatus of claim 1 wherein providing distinct treatment of the transfer buffer command relative to treatment of the logically ordered commands comprises:
    issuing at least one connection identifier update command to each of a plurality of other processes indicating that one or more connections having unique connection identifiers associated with respective ones of the logically ordered commands of the first instance of the process have been invalidated; and
    establishing new unique connection identifiers for association with respective ones of a plurality of logically ordered commands of the second instance of the process;
    wherein only a single unique connection identifier is considered valid at any given time for its corresponding connection.

11. The apparatus of claim 9 wherein providing distinct treatment of the transfer buffer command relative to treatment of the logically ordered commands comprises:
    marking each of the logically ordered commands of the first instance of the process with a barrier flag;
    wherein a particular one of the plurality of other processes receiving a given one of the logically ordered commands marked with the barrier flag waits for its maintained reference counts to go to zero on any invalidated connections before executing the given logically ordered command.

12. The apparatus of claim 11 wherein the barrier flag serves to establish a barrier between logically ordered commands of the first instance of the process and logically ordered commands of the second instance of the process.

13. The apparatus of claim 1 wherein said at least one of the processing modules comprises at least one system-wide management module implemented on a corresponding one of the nodes.

14. The apparatus of claim 1 wherein the sets of processing modules of at least a subset of the nodes each comprise at least one control module and at least one data module, with different portions of a logical address space of the storage system being assigned to different ones of the control modules, each of the control modules being configured to direct received write requests to particular ones of the data modules for storage of corresponding pages in particular storage devices.

15. A method comprising:
    configuring a clustered storage system to include a plurality of nodes, each of at least a subset of the nodes further comprising a set of processing modules configured to communicate over one or more networks with corresponding sets of processing modules on other ones of the nodes;
    in conjunction with a failure of a first instance of a process running on a given one of the nodes and a subsequent restart of a second instance of the process, at least one of the processing modules:
    identifying at least one transfer buffer command of the first instance of the process;
    identifying a plurality of logically ordered commands of the first instance of the process; and
    providing distinct treatment of the transfer buffer command relative to treatment of the logically ordered commands in a manner that ensures that the restart of the second instance of the process is not delayed to await completion of the transfer buffer command or the logically ordered commands;
    wherein the method is performed by at least one processing device comprising a processor coupled to a memory.

16. The method of claim 15 wherein providing distinct treatment of the transfer buffer command relative to treatment of the logically ordered commands comprises:
    directing each of a plurality of other processes to identify any of its buffers that are in use by one or more transfer buffer commands of the first instance of the process; and
    marking the identified buffers as ghost buffers;
    wherein any buffer marked as a ghost buffer is not utilized by the other processes until such time as its marking as a ghost buffer is cleared.

17. The method of claim 15 wherein providing distinct treatment of the transfer buffer command relative to treatment of the logically ordered commands comprises:
    issuing at least one connection identifier update command to each of a plurality of other processes indicating that one or more connections having unique connection identifiers associated with respective ones of the logically ordered commands of the first instance of the process have been invalidated; and
    establishing new unique connection identifiers for association with respective ones of a plurality of logically ordered commands of the second instance of the process;
    wherein only a single unique connection identifier is considered valid at any given time for its corresponding connection.

18. A computer program product comprising a non-transitory processor-readable storage medium having stored therein program code of one or more software programs, wherein the program code when executed by at least one processing device causes said at least one processing device:
    to configure a clustered storage system to include a plurality of nodes, each of at least a subset of the nodes further comprising a set of processing modules configured to communicate over one or more networks with corresponding sets of processing modules on other ones of the nodes;
    in conjunction with a failure of a first instance of a process running on a given one of the nodes and a subsequent restart of a second instance of the process, at least one of the processing modules being configured:
    to identify at least one transfer buffer command of the first instance of the process;
    to identify a plurality of logically ordered commands of the first instance of the process; and to provide distinct treatment of the transfer buffer command relative to treatment of the logically ordered commands in a manner that ensures that the restart of the second instance of the process is not delayed to await completion of the transfer buffer command or the logically ordered commands.

19. The computer program product of claim 18 wherein providing distinct treatment of the transfer buffer command relative to treatment of the logically ordered commands comprises:

directing each of a plurality of other processes to identify any of its buffers that are in use by one or more transfer buffer commands of the first instance of the process; and marking the identified buffers as ghost buffers;

wherein any buffer marked as a ghost buffer is not utilized by the other processes until such time as its marking as a ghost buffer is cleared.

20. The computer program product of claim 18 wherein providing distinct treatment of the transfer buffer command relative to treatment of the logically ordered commands comprises:

issuing at least one connection identifier update command to each of a plurality of other processes indicating that one or more connections having unique connection identifiers associated with respective ones of the logically ordered commands of the first instance of the process have been invalidated; and establishing new unique connection identifiers for association with respective ones of a plurality of logically ordered commands of the second instance of the process;

wherein only a single unique connection identifier is considered valid at any given time for its corresponding connection.

* * * * *

UNITED STATES PATENT AND TRADEMARK OFFICE
CERTIFICATE OF CORRECTION

PATENT NO. : 10,671,320 B2
APPLICATION NO. : 16/043281
DATED : June 2, 2020
INVENTOR(S) : Hillel Costeff et al.

Page 1 of 1

It is certified that error appears in the above-identified patent and that said Letters Patent is hereby corrected as shown below:

On the Title Page

Item (71) Applicant, please delete "EMC IP Holding Comany LLC" and insert therefor --EMC IP Holding Company LLC--

Signed and Sealed this
Fourteenth Day of July, 2020

Andrei Iancu
*Director of the United States Patent and Trademark Office*